(12) United States Patent
Miyamoto et al.

(10) Patent No.: US 11,796,812 B2
(45) Date of Patent: Oct. 24, 2023

(54) HEAD-UP DISPLAY

(71) Applicant: Panasonic Intellectual Property Management Co., Ltd., Osaka (JP)

(72) Inventors: Tomoaki Miyamoto, Osaka (JP); Yasutaka Iwamizu, Kanagawa (JP); Tsubasa Okuyama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/675,529

(22) Filed: Feb. 18, 2022

(65) Prior Publication Data
US 2022/0291506 A1 Sep. 15, 2022

(30) Foreign Application Priority Data
Mar. 11, 2021 (JP) .................. 2021-039621

(51) Int. Cl.
*G02B 27/01* (2006.01)
*B60K 35/00* (2006.01)

(52) U.S. Cl.
CPC ..... *G02B 27/0149* (2013.01); *G02B 27/0101* (2013.01); *B60K 35/00* (2013.01); *B60K 2370/1529* (2019.05); *B60K 2370/23* (2019.05); *G02B 2027/011* (2013.01); *G02B 2027/0159* (2013.01)

(58) Field of Classification Search
CPC ... G02B 27/01–0189; G02B 2027/0105–0198; B60K 35/00; B60K 2370/00–98
See application file for complete search history.

(56) References Cited

U.S. PATENT DOCUMENTS

| 2019/0278053 A1* | 9/2019 | Takahashi | .............. | B60K 35/00 |
| 2020/0192090 A1* | 6/2020 | Simpson | ............ | G02B 27/0101 |

FOREIGN PATENT DOCUMENTS

| JP | 08-271709 | 10/1996 |
| JP | 2003-131163 | 5/2003 |
| WO | 2017/208961 | 12/2017 |

* cited by examiner

*Primary Examiner* — Bao-Luan Q Le
*Assistant Examiner* — Christopher A Lamb, II
(74) *Attorney, Agent, or Firm* — GREENBLUM & BERNSTEIN, P.L.C.

(57) ABSTRACT

A head-up display that projects a virtual image onto a display medium includes: a display that emits display light that forms an image to be displayed; and a first mirror that forms a virtual image on a side opposite an observer across the display medium by guiding an image displayed by the display to the display medium. The first mirror includes: a base having a first surface and a second surface on opposite sides of the base; and a reflection surface provided on the first surface. The base includes an end portion including a rough surface and provided between the reflection surface on the first surface and a perimeter of the base. A rib is provided on a rear side of the end portion.

11 Claims, 7 Drawing Sheets

HEAD-UP DISPLAY

CROSS REFERENCE TO RELATED APPLICATION

The present application is based on and claims priority of Japanese Patent Application No. 2021-039621 filed on Mar. 11, 2021.

FIELD

The present disclosure relates to a head-up display provided in, for example, a vehicle.

BACKGROUND

Conventionally, a head-up display provided in, for example, a vehicle has been proposed (see Patent Literature (PTL) 1). PTL 1 discloses a head-up display that includes a concave mirror having an inclined end section; or a concave mirror having an end section on which emboss processing is performed.

CITATION LIST

Patent Literature

PTL 1: International Application Publication No. WO2017/208961

SUMMARY

However, the head-up display according to PTL 1 can be improved upon.

In view of this, the present disclosure provides a head-up display capable of improving upon the above related art.

A head-up display according to one aspect of the present disclosure is a head-up display that projects a virtual image onto a display medium. The head-up display includes: a display that emits display light that forms an image to be displayed; and a first mirror that forms a virtual image on a side opposite an observer across the display medium by guiding an image displayed by the display to the display medium. The first mirror includes: a base having a first surface and a second surface on opposite sides of the base; and a reflection surface provided on the first surface. The base includes an end portion including a rough surface and provided between the reflection surface on the first surface and a perimeter of the base. A rib is provided on a rear side of the end portion.

A head-up display according to one aspect of the present disclosure is a head-up display that projects a virtual image onto a display medium. The head-up display includes: a display that emits display light that forms an image to be displayed; and a first mirror that forms a virtual image on a side opposite an observer across the display medium by guiding an image displayed by the display to the display medium. The first mirror includes: a base having a first surface and a second surface on opposite sides of the base; and a reflection surface provided on the first surface. The base includes an end portion having a step shape and provided between the reflection surface on the first surface and a perimeter of the base. The step shape is recessed toward the second surface. A rib is provided on a rear side of the end portion.

A head-up display according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT (Underlying Knowledge Forming the Basis of the Present Disclosure)

The inventors found that the following problems occur with the head-up display according to PTL 1 and described in the "Background" section.

In the conventional head-up display, a step is formed at an end section of the concave mirror or emboss processing is performed on the end section of the concave mirror to prevent a sink mark. However, its rigidity decreases because the thickness of the end portion of the concave mirror is reduced. Accordingly, the concave mirror of the conventional head-up display greatly bends and an image to be projected may be deformed. This bending of the concave mirror decreases the quality of a virtual image around an image-seeable region, and the image quality of the head-up display decreases.

In view of the above, the present disclosure provides a head-up display that prevents decrease in the image quality around an image-seeable region and has an improved image quality. In other words, a head-up display according to one aspect of the present disclosure is capable of improving the image quality of a virtual image to be projected from the head-up display.

Hereinafter, an embodiment that is one aspect of the present disclosure will be specifically described with reference to the drawings.

Note that the embodiment and variations described below each show a general or specific example. The shapes, materials, structural elements, and arrangement and connection of the structural elements, for example, described in the following embodiment are mere examples, and thus are not intended to limit the present disclosure. Furthermore, among structural elements in the following embodiment, those not recited in any of the independent claims are described as optional structural elements.

The drawings are schematic diagrams, and do not necessarily provide strictly accurate illustration. In the drawings, the same numeral is given to a substantially same configuration.

In the Specification of the present application, terms that indicate relations between structural elements such as "same" and "parallel", and a term that indicates the shape of a structural element such as "concave" are not expressions that have only strict meanings, but are expressions that include substantially equivalent ranges, that is, a difference of approximately several percent, for example.

In the Specification of the present application, the terms "above", "upper", "below", and "lower" do not necessarily indicate above (vertically above) and below (vertically below) in absolute space recognition, and are defined based on a relative positional relation between a display medium and a projector. Unless specified otherwise, "above" and "upper" mean a position on a display medium side, which is a position closer to the display medium than to the display, and "below" and "lower" mean a position on a display side, which is a position closer to the display than to the display medium.

Embodiment

[1. Configuration of Head-Up Display]

Figure 1:
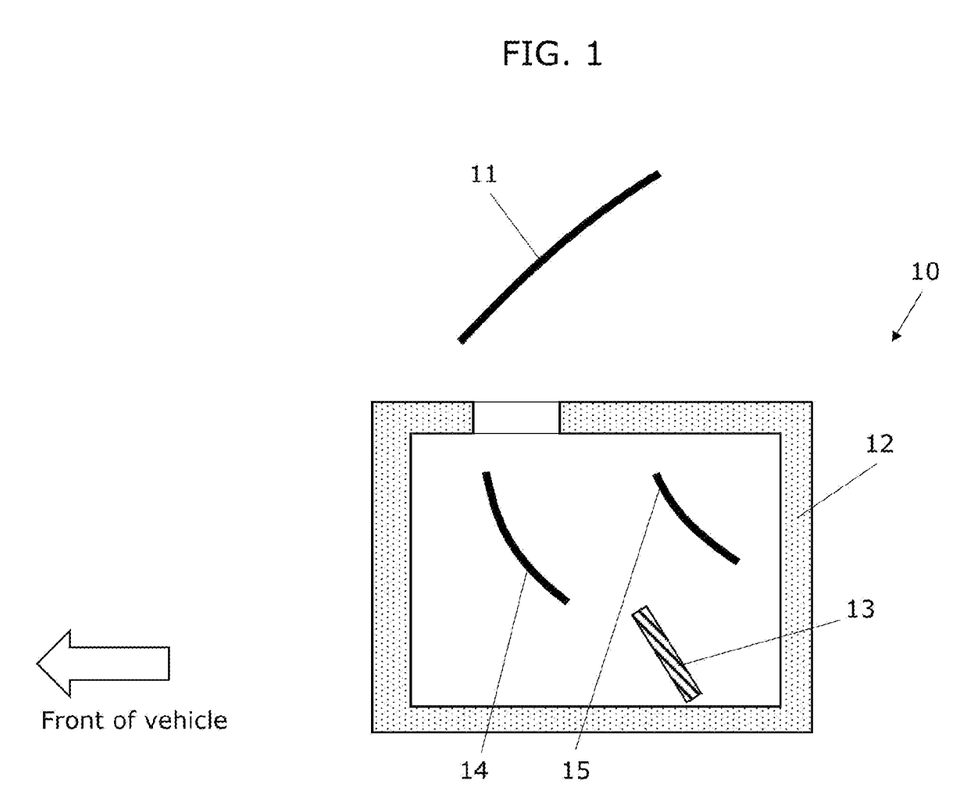
FIG. 1 is a schematic diagram of a head-up display according to an embodiment.

First, a configuration of head-up display 10 according to an embodiment will be described. FIG. 1 schematically illustrates head-up display 10 cut through a section passing through display medium 11 and extending in the vertical direction viewed from eyes of a driver (not illustrated).

As illustrated in FIG. 1, head-up display 10 according to the present embodiment is provided in a vehicle and forms a virtual image. A driver of the vehicle sees the virtual image as if the virtual image is present ahead and outside of the vehicle, for example. Head-up display 10 is provided inside of the dashboard of the vehicle. The driver is an example of an observer who sees a virtual image formed by head-up display 10.

Head-up display 10 includes casing 12, display 13, and a projection optical system. The virtual image formed by head-up display 10 is projected onto display medium 11. Display 13 and the projection optical system are housed in casing 12.

Display medium 11 shows, to a driver, a virtual image superimposed on scenery that can be seen through display medium 11. Display medium 11 is a light-transmissive component, and is achieved by a windshield or a combiner, for example. In the present embodiment, an example in which display medium 11 is a windshield will be described.

Casing 12 houses display 13 and the projection optical system. Casing 12 is, for example, a resin-molded product and disposed inside of the dashboard of the vehicle. An opening through which display light projected to display medium 11 from the projection optical system passes is formed in casing 12. The opening is covered with a cover, such as a transparent resin sheet.

Display 13 displays an image to be seen by the driver as a virtual image. Display 13 is a liquid crystal display (LCD), for example. Note that display 13 may be a device other than an LCD, such as, for example, an organic light emitting diode (an electroluminescent diode) or a vacuum fluorescent display (a seven-segment display). Display 13 may be a projector or a scanning laser. Such display 13 is stored on the bottom side of casing 12, and displays an image upward and rearward of the vehicle.

The projection optical system includes first mirror 14 and second mirror 15 that are disposed on an optical path from display 13 to a windshield, which is display medium 11. First mirror 14 is disposed on the opening side on the optical path, and second mirror 15 is disposed on the display 13 side on the optical path. First mirror 14 and second mirror 15 are both disposed above display 13. Display light emitted from display 13 is reflected by second mirror 15 to first mirror 14. The display light reflected by second mirror 15 travels toward, for example, the lower front side of the vehicle, and is guided to display medium 11. As a result, upon receiving display light reflected by first mirror 14, display medium 11 reflects the display light toward a visual point of the driver. Accordingly, the driver can see, through display medium 11, a road and objects, such as a pedestrian and a structure ahead and outside of the vehicle, and also a virtual image superimposed on the objects.

Figure 2:
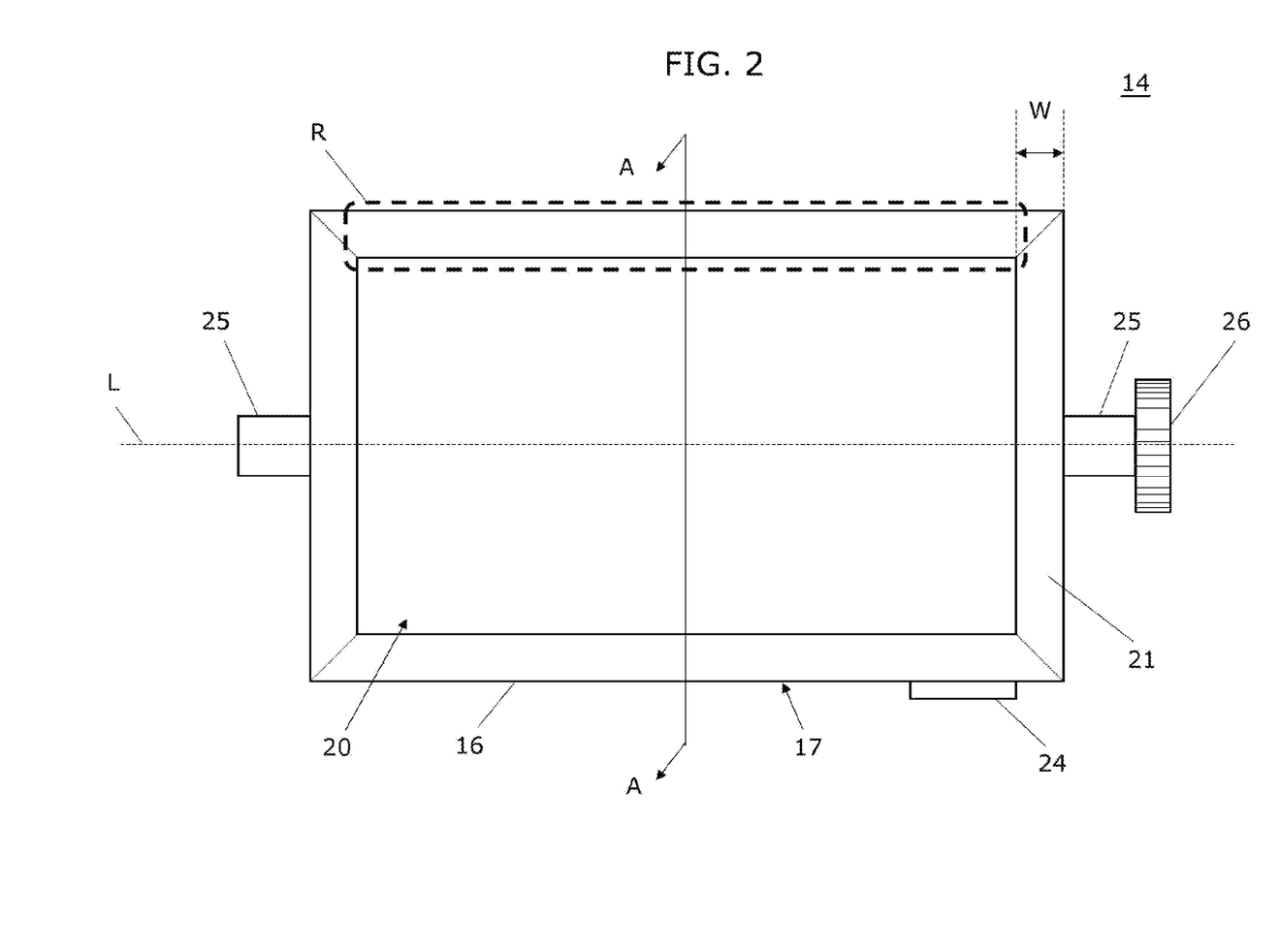
FIG. 2 is a top view of a first mirror of the head-up display.

First mirror 14 includes base 16 having a quadrilateral shape. For example, base 16 may be made of a resin-molded product formed by injection molding a resin such as polycarbonate, or glass. Base 16 is black in color. In the present embodiment, an example of base 16 having a quadrilateral shape will be described, but base 16 is not limited to a quadrilateral shape. Base 16 includes first surface 17 and second surface 18 on opposite sides of base 16, and side surface 19 between first surface 17 and second surface 18. A reflection film is provided on a center portion of first surface 17 of base 16 to form reflection surface 20, and the reflection film is not provided on end portion 21 that is outside reflection surface 20. Here, end portion 21 includes regions that surround reflection surface 20 and that are between (i) the center portion of base 16 on which reflection surface 20 is provided and (ii) the perimeter of base 16. Reflection surface 20 of first mirror 14 is concave. Reflection surface 20 of first mirror 14 may be a spherical surface or an aspherical surface (free-form surface). In the present embodiment, an example in which reflection surface 20 of first mirror 14 has a quadrilateral shape will be described, but reflection surface 20 of first mirror 14 is not limited to a quadrilateral shape.

Figure 4:
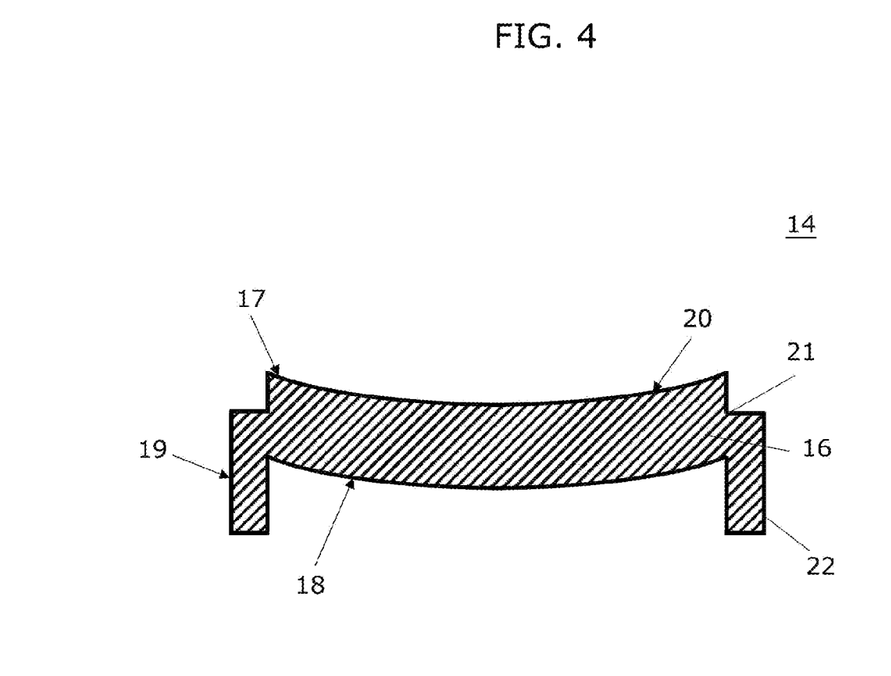
FIG. 4 is a sectional view of the first mirror taken along line A-A in FIG. 2.

End portion 21 of first mirror 14 has a step shape that is recessed toward second surface 18 from reflection surface 20, as illustrated in FIG. 4. End portion 21 is inclined with respect to reflection surface 20. In the present embodiment, an example will be described in which end portion 21 having the step shape is substantially parallel to a tangent plane that is at the substantial center of reflection surface 20. End portion 21 being substantially parallel to the substantial center of reflection surface 20 of end portion 21 means that end portion 21 is substantially parallel to the tangent plane of the reflection surface at the substantial center (the center of the figure) of reflection surface 20.

Moreover, end portion 21 of first mirror 14 includes a rough surface. In other words, emboss processing is performed on end portion 21, and minute projections and depressions are provided on the surface of end portion 21. The entire end portion 21 of first mirror 14 is processed to include a rough surface.

The inner perimeter and the outer perimeter of end portion 21 of first mirror 14 are parallel to each other. The shortest distance W between any side of the inner periphery and a side of the outer perimeter facing the side is the same in any regions of end portion 21, i.e., upper, lower, right, and left regions, for example. Here, the left and right directions of first mirror 14 are left and right directions as viewed from a top surface of first mirror 14, that is, as viewed from the first surface 17 side in a state that first mirror 14 is attached to casing 12. In FIG. 2, the up, down, right, and left directions of the figure respectively correspond to the up, down, right, and left directions of first mirror 14. Distance W between the inner perimeter and the outer perimeter of end portion 21 need not be equal in all the regions, and may differ depending on the regions. End portion 21 can be designed easily if distance W between the inner perimeter and the outer perimeter is equal in the upper, lower, left, and right regions.

Rib 22 is provided on the rear side (the second surface 18 side) of end portion 21 of first mirror 14. In other words, rib 22 is provided at a position that overlaps the region having the step shape and the region including the rough surface of end portion 21, as viewed from the first surface 17 side. In the present embodiment, the area of the region having the step shape and the region including the rough surface of end portion 21 is equal to the area of rib 22, as viewed from the first surface 17 side. In part of rib 22, thick portion 23 having a thickness greater than the thickness of any other part of rib 22 is formed. The thickness is in the direction from first surface 17 to second surface 18 of base 16. Projection 24 is provided on rib 22 and projects from a side surface of first mirror 14. In FIG. 2, rib 22 is provided on the entire end portion 21 as with the rough surface. In the example of the present embodiment, rib 22 and base 16 are integrally formed when first mirror 14 is formed.

On side surface 19 of base 16 of first mirror 14, supports 25 are provided. First mirror 14 is rotatably supported by supports 25 and attached to casing 12. Supports 25 are connected to gear 26. Gear 26 rotates using a motor (not illustrated) as a driving source. First mirror 14 rotates about straight line L connecting two supports 25. The angle of first mirror 14 is adjusted by rotation of the motor. Note that the motor is an example of an actuator in the present embodiment.

Second mirror 15 includes base 16 having a quadrilateral shape. For example, base 16 may be made of a resin-molded product formed by injection molding a resin such as polycarbonate, or glass. In the present embodiment, an example of base 16 having a quadrilateral shape will be described, but base 16 is not limited to a quadrilateral shape. Reflection surface 20 is provided on base 16. Reflection surface 20 is convex, for example. Reflection surface 20 may be flat or concave. Reflection surface 20 of second mirror 15 may be a spherical surface or an aspherical surface (free-form surface). Second mirror 15 is fixed to casing 12.

When reflection surface 20 of first mirror 14 is concave and reflection surface 20 of second mirror 15 is convex, what is called a telephoto type optical system can be formed. With a telephoto type optical system, the power of first mirror 14 (i.e., the refracting power of first mirror 14) increases, and an effect due to deformation of a virtual image resulting from profile irregularity of end portion 21 of first mirror 14 increases. Therefore, providing rib 22 on the rear side of end portion 21 of first mirror 14 is more effective.

[2. Operations and Effects of Head-Up Display]

Operations and effects of head-up display 10 will be described.

First mirror 14 is rotated by the motor and adjusts the position of a virtual image to be displayed. When first mirror 14 is rotated, stress is applied to first mirror 14. Thus, first mirror 14 deforms. In particular, the stress increases as the distance from the rotation axis of first mirror 14 increases, and the largest stress is applied to end portion 21 of first mirror 14. Accordingly, end portion 21 of first mirror 14 deforms greatly.

First mirror 14 includes rib 22 on second surface 18. Therefore, the rigidity of end portion 21 is increased compared with when rib 22 is not provided. Moreover, since rib 22 is provided, the rigidity of end portion 21 is greater than the rigidity of the center portion of first mirror 14 on which reflection surface 20 is provided. Since end portion 21 has an increased rigidity, the deformation of first mirror 14 that occurs when first mirror 14 is rotated can be reduced. Moreover, providing rib 22 also makes it possible to prevent first mirror 14 from warping.

When first mirror 14 is formed by injection molding, a sink mark occurs on end portion 21 as a result of providing rib 22. When a sink mark occurs on base 16, the display light reflected by the sink mark may be reflected in a direction to which the display light is not designed to be reflected. Therefore, the virtual image to be projected from head-up display 10 deforms, and the image quality decreases. This sink mark can be corrected by adjusting molding conditions, but this extends the molding cycle. Consequently, the productivity significantly decreases.

End portion 21 of head-up display 10 is formed to have a step shape. Since end portion 21 has a step shape, a portion where a sink mark has occurred due to formation of rib 22 is recessed toward the second surface 18 side. Thus, the sink mark will be less noticeable, and the effects due to the sink mark can be reduced. Such a step-shaped end portion 21 has a reduced thickness, but providing rib 22 on the rear side of end portion 21 can make end portion 21 thicker and increase the rigidity. Furthermore, the entire end portion 21 is inclined with respect to reflection surface 20. Therefore, the display light reflected by end portion 21 is less likely to travel toward display medium 11. In other words, when head-up display 10 is provided in a vehicle, sunlight entered the vehicle from display medium 11 enters casing 12 from the opening. The sunlight entered casing 12 is usually reflected in the direction toward second mirror 15 upon incident on first mirror 14. In particular, on end portion 21 of first mirror 14, the sunlight incident on end portion 21 is reflected in the direction toward second mirror 15 as with when the sunlight is incident on reflection surface 20, and is likely to be repeatedly reflected by, in stated order, display 13, second mirror 15, first mirror 14, and display medium 11. This tends to cause stray light that can be seen by a driver. However, when end portion 21 is substantially parallel to the substantial center of reflection surface 20, sunlight reflects in a direction different from the direction of reflection by reflection surface 20, and thus the sunlight is not likely to be reflected in the direction toward second mirror 15. Accordingly, forming end portion 21 substantially parallel to the substantial center of reflection surface 20 can prevent the sunlight reflected by end portion 21 from turning into stray light. Therefore, forming end portion 21 to have a step shape and include right, left, upper, and lower regions that are substantially parallel to the substantial center of reflection surface 20 makes it possible to reduce effects of a sink mark and effects of deformation due to rotation of first mirror 14, and also reduce the effects of stray light. Moreover, when end portion 21 has a step shape, a masking jig for forming a reflection film can be applied to the step shape during formation of the reflection film of first mirror 14. Accordingly, the masking jig can be placed more accurately.

Accordingly, since first mirror 14 has end portion 21 having a step shape and rib 22 that is formed on the rear side of end portion 21, effects of a sink mark occurring on end portion 21 can be reduced while the rigidity of end portion 21 of first mirror 14 is increased. This makes it possible to improve the image quality of a virtual image to be projected from head-up display 10.

End portion 21 of head-up display 10 includes a rough surface. The display light reflected by the rough surface will be diffused, and thus the display light is less likely to be transmitted toward display medium 11. Accordingly, forming a rough surface on end portion 21 can reduce effects of a sink mark occurring on end portion 21.

Moreover, forming such a rough surface reduces the thickness of end portion 21 where the rough surface is formed, but providing rib 22 on the rear side of the rough surface can increase the rigidity of end portion 21. Increasing the rigidity of end portion 21 makes end portion 21 less likely to be deformed even when first mirror 14 is rotated.

Accordingly, since first mirror 14 includes a rough surface and rib 22, effects of a sink mark occurring on end portion 21 can be reduced while the rigidity of end portion 21 of first mirror 14 is increased. This makes it possible to improve the image quality of a virtual image to be projected from head-up display 10.

The effects of the present disclosure can be obtained by having one of the following structures: (i) end portion 21 having a step shape and including rib 22, or (ii) end portion 21 including a rough surface and rib 22. Since first mirror 14 includes end portion 21 having a step shape and a rough surface, this structure further reduces effects of distortion of a virtual image due to a sink mark occurring on end portion 21, compared with in cases where end portion 21 has only a step shape or a rough surface. Therefore, the image quality of the virtual image to be projected from head-up display 10 increases compared with either of the cases where end portion 21 has a step shape or end portion 21 includes a rough surface.

All of the regions of end portion 21, namely, upper, lower, left, and right regions, have a step shape and include a rough surface. In other words, the entire end portion 21 has a step shape and a rough surface. Accordingly, rib 22 is also provided along the entire perimeter of second surface 18. Since rib 22 is provided along the entire perimeter, effects of distortion of a virtual image due to a sink mark can be reduced while the rigidity of the entire end portion 21 of first mirror 14 is increased. This increases the effects of the present disclosure, compared with cases where only part of end portion 21 has a step shape and a rough surface. In particular, the stress occurring during rotation of first mirror 14 can be effectively reduced by forming rib 22 in regions (upper and lower regions) of end portion 21, which are far from the rotation axis of first mirror 14.

Moreover, base 16 of first mirror 14 is black in color. A black coating may be applied to base 16 or base 16 may be formed using a black material. Forming such a black base 16 can reduce reflection of visible light, and thus this reduces reflection of display light off end portion 21. This further reduces effects of a sink mark. Note that the color of base 16 is not limited to black. A color having a low reflectivity to visible light is still effective but the reflection of visible light is greatly reduced with a black base 16.

Rib 22 may have a thickness that increases the rigidity of end portion 21 than the rigidity of the center portion of base 16. Moreover, providing rib 22 also makes it possible to adjust a resonance frequency of first mirror 14. Adjusting a resonance frequency of first mirror 14 makes it possible to take measures against vibrations occurring in a vehicle in which head-up display 10 is provided.

Rib 22 can provide the effects of the present disclosure as long as rib 22 is formed to overlap part of the rear side of the regions of end portion 21 in which a step shape and a rough surface is formed, as viewed from first surface 17. In the present embodiment, rib 22 is formed such that rib 22 overlaps the entire step shape and rough surface, as viewed from first surface 17. Accordingly, the rigidity of all the regions of end portion 21 is higher than the rigidity of the center portion of base 16.

Figure 3:
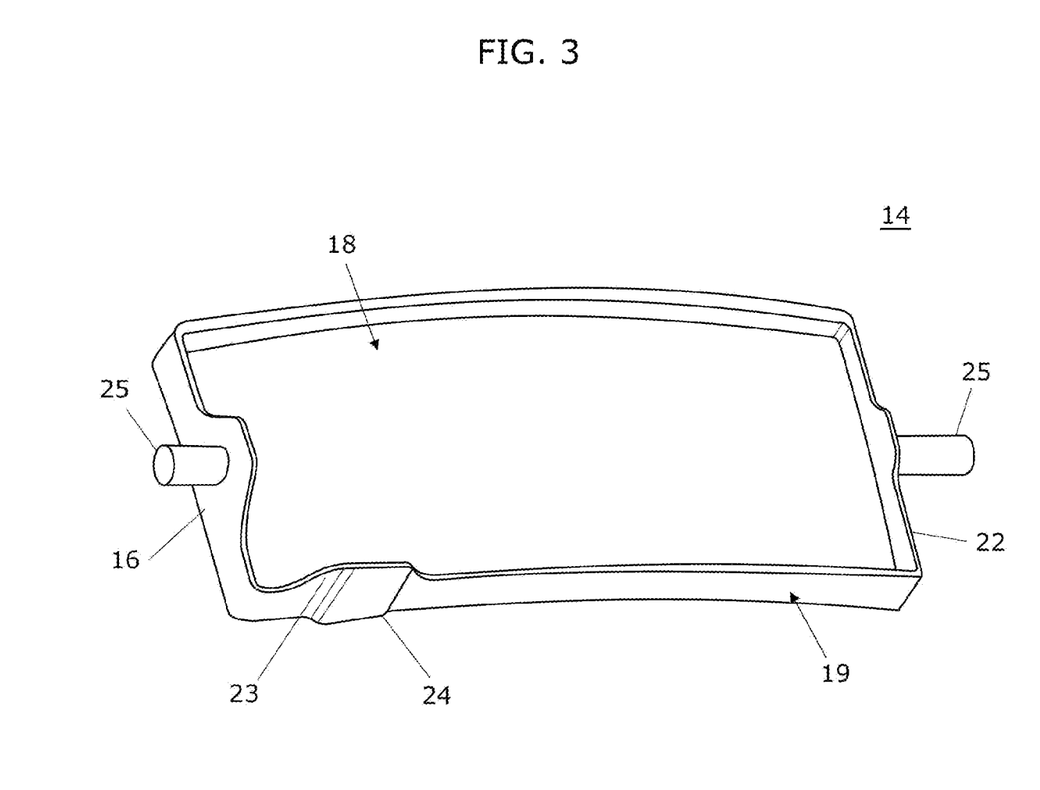
FIG. 3 is a bottom oblique view of the first mirror.

Rib 22 includes thick portion 23. Providing thick portion 23 on rib 22 makes it easier to adjust a resonance frequency of first mirror 14. This makes it easier to take measures against vibrations. Moreover, stress occurring when first mirror 14 is rotated can be greatly reduced by providing thick portion 23 of rib 22 in a region of end portion 21 that is far from the rotation axis of first mirror 14. This reduces deformation of first mirror 14 that occurs when first mirror 14 is rotated. In FIG. 2 and FIG. 3, thick portion 23 is provided on the lower right of first mirror 14, but the position of thick portion 23 may be changed appropriately.

Projection 24 is formed on side surface 19 of first mirror 14. Projection 24 projects from side surface 19. Providing projection 24 makes it easier to adjust a resonance frequency of first mirror 14. This makes it easier to take measures against vibrations. In FIG. 2 and FIG. 3, projection 24 is provided on the lower right of first mirror 14, but the position of projection 24 may be changed appropriately.

A groove may be provided in part of side surface 19 including rib 22 of first mirror 14. Providing a groove in side surface 19 of first mirror 14 also makes it possible to adjust a resonance frequency of first mirror 14. This groove may be provided during mold making, or provided through secondary processing after injection molding.

Note that although an example of head-up display 10 including second mirror 15 has been described, a configuration without second mirror 15 is also possible. Head-up display 10 can be downsized when the configuration does not include second mirror 15.

Variations

The head-up display according to the present disclosure has been described above based on the embodiment, but the present disclosure should not be limited to the above embodiment. For example, the present disclosure also includes embodiments as a result of adding various modifications that may be conceived by those skilled in the art to the embodiment, and embodiments obtained by combining structural elements and functions in the embodiment as long as the combination does not depart from the scope of the present disclosure.

Figure 5:
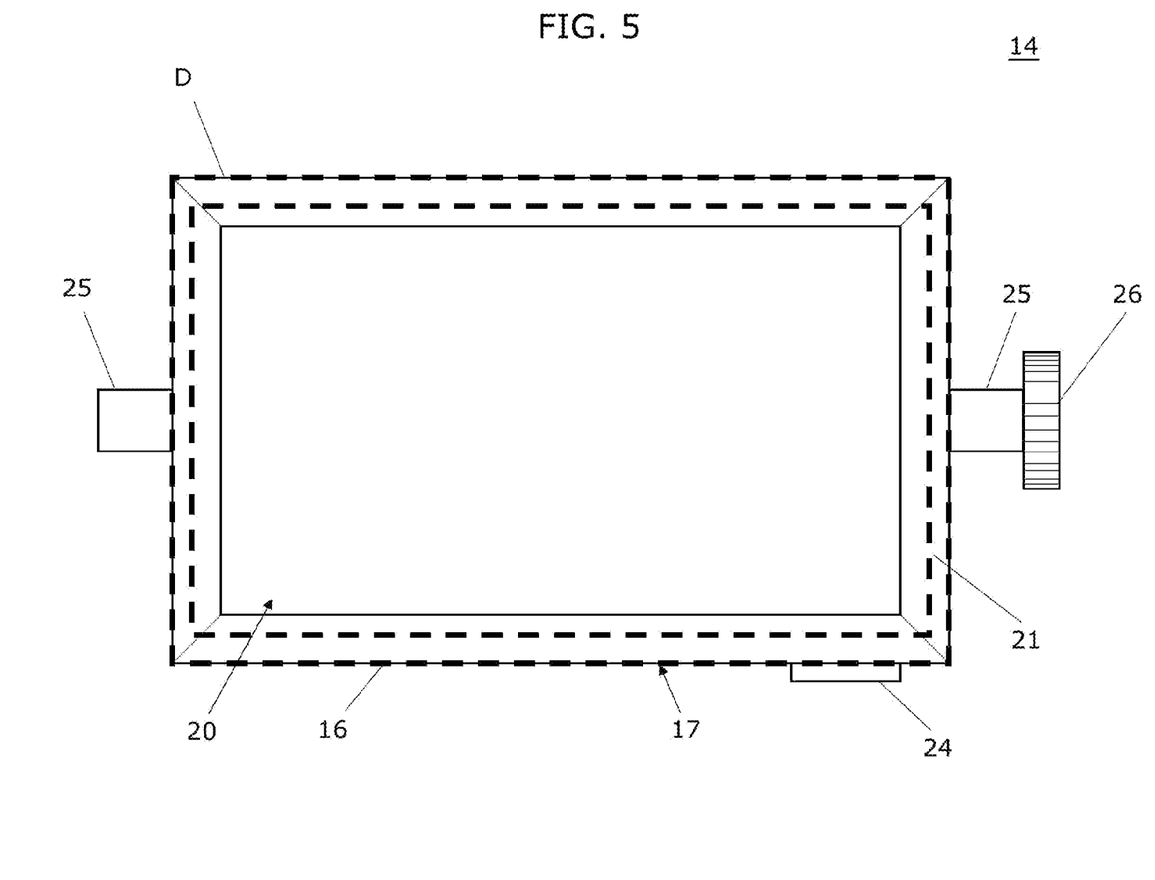
FIG. 5 is a top view of a first mirror according to a variation.

The present embodiment has been described using the example in which the area of the regions of end portion 21 having a step shape and a rough surface is equal to the area of rib 22, as viewed from the first surface 17 side. However, the present disclosure should not be limited to this example. Head-up display 10 can be downsized by forming the area of rib 22 to be less than the area of the regions of end portion 21 each having a step shape and a rough surface, as viewed from the first surface 17 side. This example is illustrated in FIG. 5. FIG. 5 illustrates first mirror 14 as viewed from the first surface 17 side. Dashed lines D show the perimeter of rib 22. As illustrated in FIG. 5, rib 22 may be formed such that the entire rib 22 is inside the regions in which the step shape and the rough surface of end portion 21 are formed, as viewed from the first surface 17 side.

Figure 6:
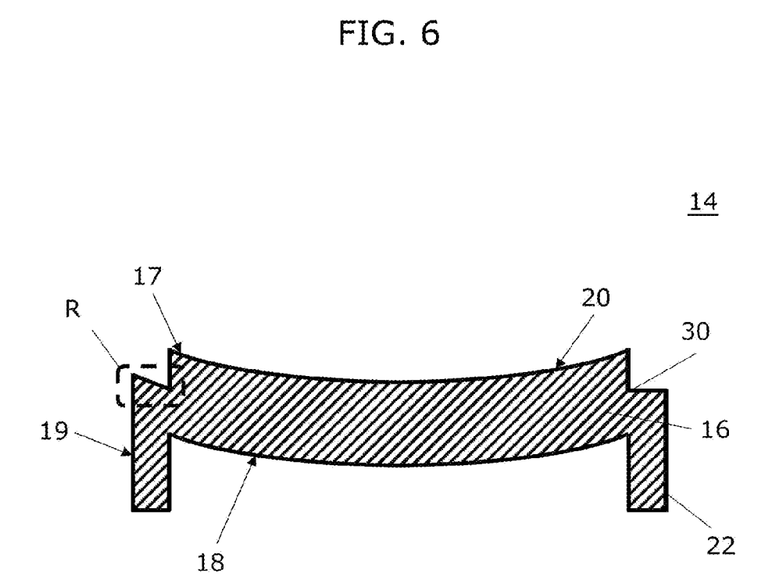
FIG. 6 is a sectional view of the first mirror according to a variation.

In the above embodiment, the example has been described in which the upper region of end portion 21 of first mirror 14 is formed to be substantially parallel to the substantial center of reflection surface 20 and inclined with respect to the inclination direction of reflection surface 20. However, the present disclosure should not be limited to this example. The upper region of end portion 21 may be inclined in the same direction as the inclination direction of reflection surface 20. FIG. 2 shows the upper region of end portion 21 as region R surrounded by the dashed line. In FIG. 6, region R is on the left side of the figure. FIG. 6 is a sectional view of first mirror 14 according to a variation taken along line A-A in FIG. 2. In FIG. 6, first mirror 14 is disposed such that the upper region of end portion 30, which is indicated by region R, is closer to display medium 11 among the regions of end portion 30. In end portion 30, only region R, which is closer to display medium 11, is formed to be parallel to reflection surface 20. The remaining lower, left, and right regions of end portion 30 are inclined with respect to reflection surface 20.

Figure 7:
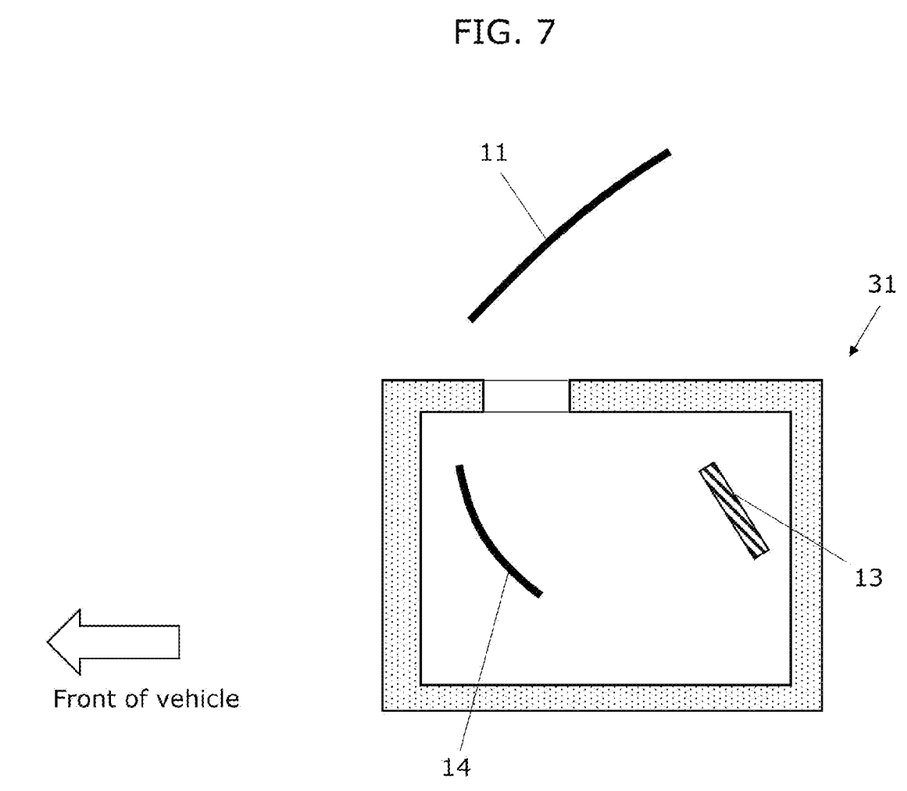
FIG. 7 is a schematic diagram of a head-up display according to a variation.

In the above embodiment, the projection optical system having a structure including two mirrors, first mirror 14 and second mirror 15, has been described, but this should not be construed as limiting. The projection optical system may include one mirror, or three or more mirrors. Moreover, the projection optical system may include a lens. FIG. 7 is a schematic diagram of head-up display 31 that includes a projection optical system including one mirror.

The projection optical system includes first mirror 14 disposed on an optical path from display 13 to the windshield, which is display medium 11. First mirror 14 is disposed above display 13. The display light reflected by first mirror 14 is guided to display medium 11. Upon receiving display light reflected by first mirror 14, display medium 11 reflects the display light toward a visual point of the driver. Accordingly, the driver can see, through display medium 11, a road and objects, such as a pedestrian and a structure ahead and outside of the vehicle, and also a virtual image superimposed on the objects.

The projection optical system of head-up display 31 only includes first mirror 14. Therefore, head-up display 31 is downsized compared with head-up display 10 according to the embodiment above, which includes the projection optical system including two mirrors.

While an embodiment has been described herein above, it is to be appreciated that various changes in form and detail may be made without departing from the spirit and scope of the present disclosure as presently or hereafter claimed.

Further Information about Technical Background to this Application

The disclosures of the following patent application including specification, drawings, and claims are incorporated herein by reference in their entirety: Japanese Patent Application No. 2021-039621 filed on Mar. 11, 2021.

INDUSTRIAL APPLICABILITY

The present disclosure is applicable to a head-up display provided in a vehicle, for example.

What is claimed is:

1. A head-up display that projects a virtual image onto a display medium, the head-up display comprising:
   a display that emits display light that forms an image to be displayed; and
   a first mirror that forms a virtual image on a side opposite an observer across the display medium by guiding an image displayed by the display to the display medium, wherein
   the first mirror includes: a base having a first surface and a second surface on opposite sides of the base; and a reflection surface integrally provided on the first surface,
   the base includes an end portion including a rough surface and provided between the reflection surface on the first surface and a perimeter of the base, and a rib is integrally provided on a rear side of the end portion, and
   the end portion extends outwardly along an entirety of the perimeter of the base so as to surround the reflection surface.

2. The head-up display according to claim 1, the rough surface is provided on an entire surface of the end portion.

3. The head-up display according to claim 1, wherein the rib is provided on an entire rear side of the rough surface.

4. The head-up display according to claim 1, wherein the end portion has a step shape that is recessed toward the second surface from the first surface.

5. The head-up display according to claim 4, wherein the end portion having the step shape includes a region closer to the display medium and a remaining region, the region closer to the display medium is parallel to the reflection surface, and the remaining region is inclined with respect to the reflection surface.

6. The head-up display according to claim 1, wherein the rib includes a thick portion that is thicker than any other part of the rib.

7. The head-up display according to claim 1, further comprising:
   an actuator that rotates the first mirror,
   wherein the first mirror is rotatably supported by the actuator via a support provided on the base.

8. The head-up display according to claim 1, further comprising:
   a second mirror between the display and the first mirror, the second mirror reflecting the display light emitted from the display to the first mirror.

9. The head-up display according to claim 8, wherein the first mirror is a concave mirror and the second mirror is a convex mirror.

10. A head-up display that projects a virtual image onto a display medium, the head-up display comprising:
    a display that emits display light that forms an image to be displayed; and
    a first mirror that forms a virtual image on a side opposite an observer across the display medium by guiding an image displayed by the display to the display medium, wherein
    the first mirror includes: a base having a first surface and a second surface on opposite sides of the base; and a reflection surface integrally provided on the first surface,
    the base includes an end portion having a step shape and provided between the reflection surface on the first surface and a perimeter of the base, the step shape is recessed toward the second surface, and a rib is integrally provided on a rear side of the end portion, and
    the end portion extends outwardly along an entirety of the perimeter of the base so as to surround the reflection surface.

11. A head-up display that projects a virtual image onto a display medium, the head-up display comprising:
    a display that emits display light that forms an image to be displayed; and
    a first mirror that forms a virtual image on a side opposite an observer across the display medium by guiding an image displayed by the display to the display medium, wherein
    the first mirror includes:
       a base having a first surface and a second surface on opposite sides of the base;
       a reflection surface integrally provided on the first surface;
       a rib that includes a thick portion that is thicker than any other part of the rib; and an end portion that extends outwardly along an entirety of a perimeter of the base so as to surround the reflection surface.

* * * * *